UNITED STATES PATENT OFFICE.

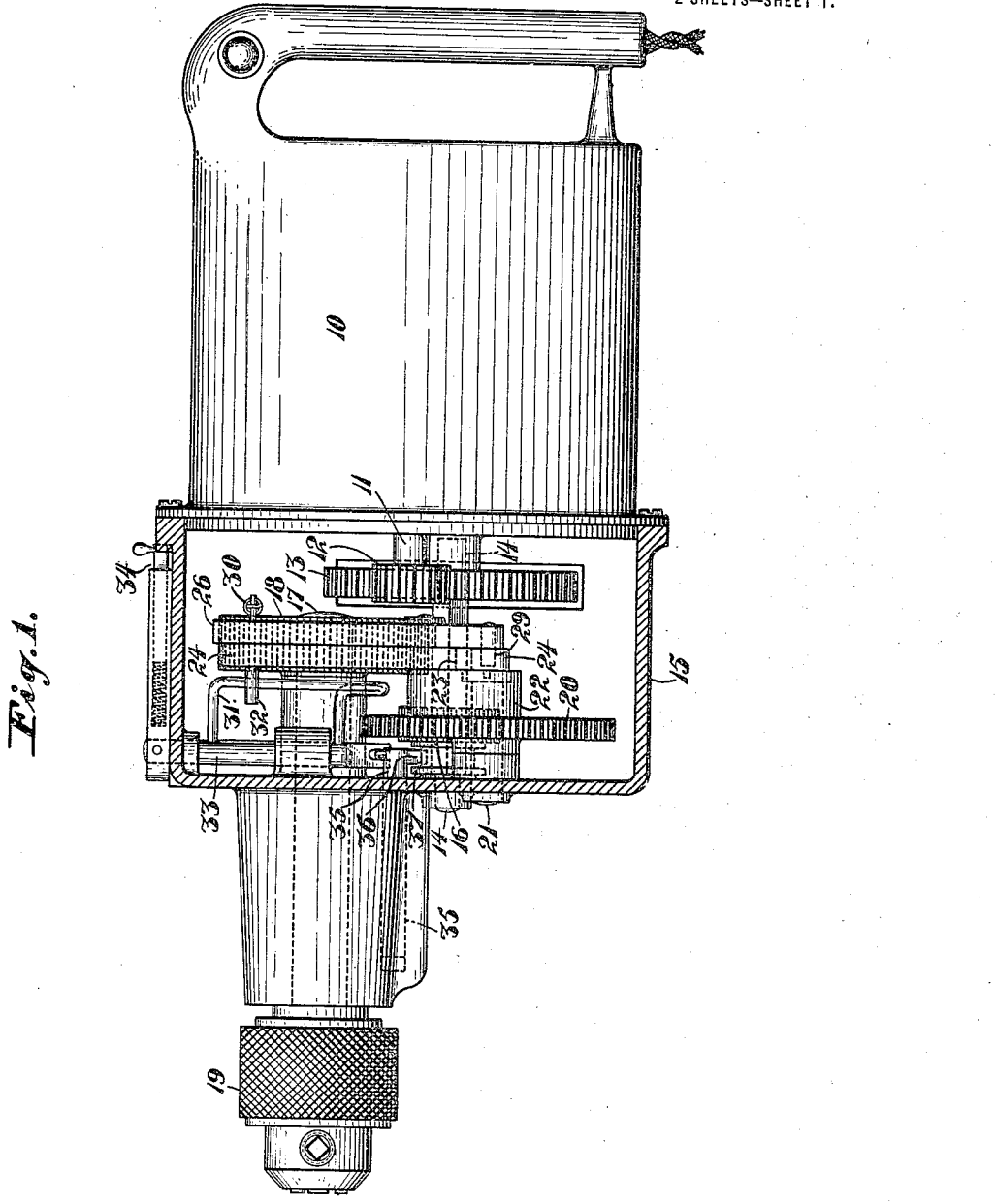

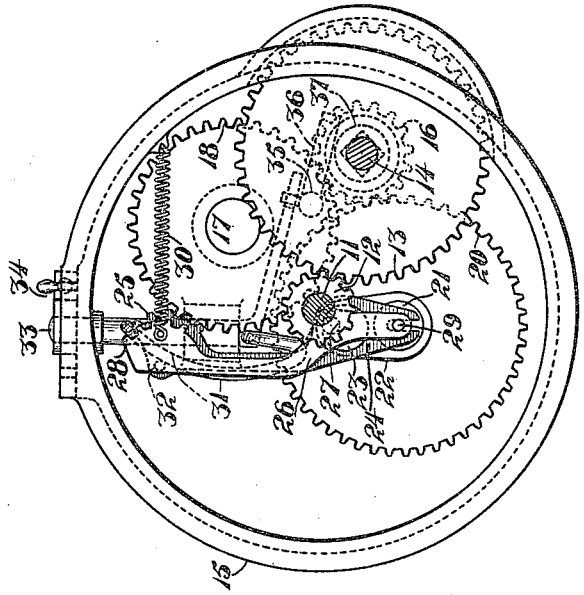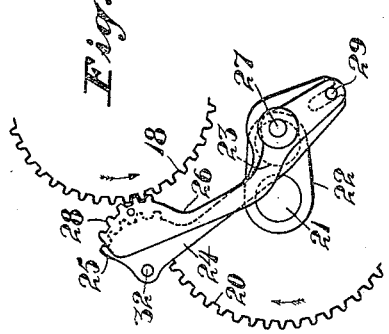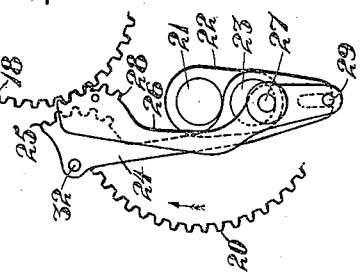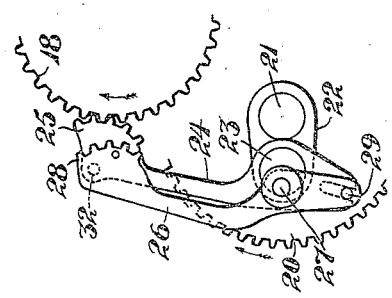

PHILIP MacKENZIE, OF SAN FRANCISCO, CALIFORNIA.

COMBINED DRILL AND VALVE GRINDER.

1,425,402.    Specification of Letters Patent.    Patented Aug. 8, 1922.

Application filed June 30, 1920. Serial No. 393,021.

*To all whom it may concern:*

Be it known that I, PHILIP MACKENZIE, a subject of the King of England, residing at San Francisco, in the county of San Francisco and State of California, have invented a new and useful Improvement in Combined Drill and Valve Grinders, of which the following is a specification.

This invention relates to a combined drill and valve grinder and has for its object to provide in a single unitary structure means for continuously rotating a chuck whereby to adapt the device for ordinary drilling purposes and also to provide means for imparting an oscillating action to the chuck whereby to adapt the device for use in grinding valves.

The device in its present form includes a motor or engine preferably of the small portable type which, through a train of speed increasing gearing rotates a chuck continuously in one direction in the manner of the usual type of drills. A shiftable gear is included in said train and is adapted to connect with a second train of gears which latter includes a pair of reciprocating pawls alternately meshing with a gear for imparting oscillating movement to the chuck. Also in connection with the reciprocating pawls, I provide means for imparting an additional movement to the chuck in one direction so that the latter will be advanced a slight distance, each oscillation for the purpose of progressively turning the valve in its seat so as to insure evenness of grinding.

One form which my invention may assume is exemplified in the following description and illustrated in the accompanying drawings, in which:

Fig. 1 shows a side elevation partly in section of a device embodying my invention.

Fig. 2 shows a circumferential sectional view of the housing and enclosed gears.

Figs. 3, 4, and 5 show details of the reciprocating mechanism in various positions of movement.

Referring more in detail to the accompanying drawings, I show a casing 10 which contains a motor, the shaft 11 of which motor carries a pinion 12 meshing with a gear 13 on a shaft 14, the latter being supported in a housing 15 detachably secured to one end of the casing 10. On the shaft 14 is a slidable pinion 16 adapted to mesh when in one position with a gear 18 fixed upon the spindle 17 of a chuck 19. Through the gearing just described, the motor will thus operate the chuck continuously in one direction for drilling and similar purposes.

In its other position this shiftable pinion 16 meshes with a gear 20 supported on an axle 21 arranged within the housing 15. This gear 20 carries a crank arm 22 to which is connected by means of a wrist pin 23 an arm 24 having at its outer end a segmental gear 25 to co-operate with the gear 18 on the chuck spindle. A second arm 26 similar to the arm 24 is eccentrically pivoted at 27 to the wrist pin, 23. This arm 26 has a segmental gear or pawl teeth 28 to co-operate with the gear 18, said gear 18 being made extra wide for this purpose. The opposite end of the arm 26 projects beyond the eccentric mounting and has a pin 29 working in a slot formed in the corresponding end of the arm 24. A spring 30 connects with the arm 26 and in turn to the housing 15 and is arranged to exert a pull upon said arm in a direction to cause it to move towards the gear 18.

Having regard to the position of the parts shown in Figs. 2 and 5 inclusive, it will be noted that on the down stroke of the arm 26 the teeth on said arm will be pulled into engagement with the gear 18 and thereby the gear 18 will be moved to the left. When the arm 26 reaches the bottom of its stroke, the position of its eccentric mounting will cause it to be swung so as to disengage the teeth 28 from the gear 18 and in so doing the arm 24 will be rocked to bring its teeth 25 into engagement with said gear owing to the connection 29 between said arms 24 and 26. On the upward movement of said arms, the teeth 25 will cause the gear 18 to be turned to the right, but the length of movement of the arm 24 being less than that of the arm 26, the movement of the gear 28 to the right will be less than its movement to the left. The reason for this is found in the fact that the length of movement of the arm 26 is increased by the eccentric mounting. The result of this is that the gear 18 will be stepped ahead in one direction one or more teeth at the end of each cycle of movement of the reciprocating arms 24 and 26, and in consequence thereof the chuck will be progressively stepped ahead so as to insure even grinding of the valve within its seat.

In order that the segmental gears 25 and 28 may be thrown out of mesh with the gear 18 when the device is being used as a rotary drill, I provide a guide rod 31 formed in a curve struck from the center of the gear 18. Co-operating with said guide rod is a pin 32 fixed upon the arm 24 and normally disposed at the outer side thereof. The guide rod 31 is carried by a turnable support 33 within the housing 15 and said support is controlled by a lever and detent mechanism 34 disposed at the exterior of the housing. By turning the lever 34, the guide rod 31 will be moved in a direction to shift the segmental gears out of mesh with the gear 18.

For shifting the gear 16, I provide a shift bar 35 extending from a point outside the housing along the bearing for the chuck spindle to a point within the housing where it connects with a shift arm 36 lying within a groove 37 formed on the hub of the shiftable gear 16. When it is desired to convert the device from a rotary drill to a valve grinder or vice versa, the gear is shifted to the desired position by the mechanism just described.

The eccentric movement of the pivot on which the pawl arm 26 is journaled will carry the short end of said pawl arm inwardly towards the spur gear 18 on the down stroke and therefore the corresponding end of the pawl arm 24 will be moved inwardly resulting in the disengagement of the segmental gear 25 from the spur gear 18. When the crank arm starts its upward movement, the eccentrically arranged pivot 27 will move away from the spur gear 18 thereby carrying the short end of the pawl arm 26 with it. To permit this movement, however, the corresponding end of the pawl arm 24 will have to move in unison therewith and such movement of this end of the said arm 24 will cause the opposite end of the said arm 24 to move into engagement with the spur gear 18. The movement of the eccentric pivot 27 will be sufficient to carry the long end of the pawl arm 26 out of engagement with the spur gear 18 even as against the pull of the spring 30, thereby causing the teeth 28 to be disengaged from the spur gear 18.

Various changes in the construction and arrangement of the several parts may be employed without departing from the spirit of my invention as disclosed in the appended claims.

Having thus described my invention, what I claim and desire to secure by Letters Patent is:

1. In a machine tool, a rotary driving element, a chuck, a spur gear on the chuck spindle, a pair of reciprocating pawls alternately engageable with the spur gear for imparting oscillating movement thereto, a spur gear for driving said pawls, and a sliding gear alternately engageable with said spur gears for transmitting continuous rotary motion from the driving element to the chuck or oscillating movement from the driving element to said chuck.

2. In a machine tool, a rotary driving element, a chuck, a spur gear on the chuck spindle, a pair of reciprocating pawls alternately engageable with the spur gear for imparting oscillating movement thereto, a spur gear for driving said pawls, a sliding gear alternately engageable with said spur gears for transmitting continuous rotary motion from the driving element to the chuck or oscillating movement from the driving element to said chuck, and means for effecting disengagement of both pawls from the spur gear when the latter is being rotated continuously in one direction.

3. In a machine tool of the character described, a constantly rotating driving element, a chuck and a pair of reciprocating pawls actuated by the rotating element, a member on the chuck with which the pawls engage and means for controlling the pawls to impart a progressive oscillating movement to the member on the chuck.

4. In a machine tool, a rotary driving element, a chuck, a gear on the chuck spindle, a crank arm driven by the rotary driving element, a pair of pawls mounted on the crank arm, and means to cause one pawl to engage the gear during one-half the cycle of movement of the crank arm and the other pawl to engage the gear during the remaining half of the cycle whereby to impart movement to the gear in opposite directions.

5. In a machine tool, a rotary driving element, a chuck, a gear on the chuck spindle, a crank arm driven by the rotary driving element, a pair of pawls mounted on the crank arm, and means to cause one pawl to engage the gear during one-half the cycle of movement of the crank arm and the other pawl to engage the gear during the remaining half of the cycle whereby to impart movement to the gear in opposite directions, said pawls being connected at different distances from the center of the crank whereby the movement imparted to the gear will be unequal in opposite directions.

6. In a machine tool, a rotary driving element, a chuck, a gear on the chuck spindle, a crank arm driven by the rotary driving element, a pair of arms pivotally mounted on the crank arm at different distances from the center thereof, a segmental gear on each arm for co-action with said gear on the chuck spindle, and means to cause the segmental gears to alternately engage with the gear on the chuck spindle whereby to impart unequal movements thereto in opposite directions.

7. In a machine tool, a rotary driving element, a chuck, a spur gear on the chuck spindle, a crank arm driven by said rotary driving element, a wrist pin on the crank arm, a pawl concentrically mounted on the wrist pin, a second pawl eccentrically mounted on the wrist pin, and means to cause said pawls to alternately engage with the spur gear whereby to impart unequal movements thereto in opposite directions.

8. In a machine tool, a rotary driving element, a chuck, a spur gear on the chuck spindle, a crank arm driven by said rotary driving element, a wrist pin on the crank arm, a pawl concentrically mounted on the wrist pin, a second pawl eccentrically mounted on the wrist pin, a spring connected with one of said pawls and acting to move the same towards the spur gear, and a sliding and pivotal connection between said pawls acting in conjunction with the eccentric mounting to cause the pawls to alternately engage with the spur gear for imparting unequal movements to the latter in opposite directions.

In testimony whereof I have hereunto set my hand in the presence of two subscribing witnesses.

PHILIP MacKENZIE.

Witnesses:
W. W. HEALEY,
M. E. EWING.